United States Patent Office 2,839,571
Patented June 17, 1958

2,839,571

ESTER PRODUCTS

Christian W. Johnston, Chicago, Ill., and Robert A. Meara, Baltimore, Md., assignors to National Distillers and Chemical Corporation, a corporation of Virginia No Drawing. Application August 12, 1955
Serial No. 528,121

4 Claims. (Cl. 260—485)

This invention relates broadly to a new class of esters from selected mixtures of $C_{10}$ diacids and especially to such esters prepared from mixtures of $C_{10}$ diacids which have been discovered to be particularly effective as plasticizers for resinous and rubbery vinyl polymers and copolymers, and are useful as synthetic lubricants, as intermediates in preparation of polyesters and polyamides, and as hydraulic fluids. More specifically, this invention relates to alkyl esters of $C_{10}$ diacid mixtures and especially the dibutyl, dicapryl, the di-n-octyl, the di-2-ethyl hexyl, and the di-isooctyl esters of such mixtures.

The increasing manufacture and uses of plastic materials such as vinyl resins, polyacrylate resins, polymethylmethacrylate resins, rubbers such as the emulsion copolymers of butadiene with a minor amount of styrene or acrylonitrile, or the copolymers of isobutylene with small amounts of a diolefin such as isoprene or butadiene have created a large demand for suitable plasticizers. This is particularly true in the case of vinyl resins such as vinyl chloride, and copolymers of this material with, for example, vinyl acetate.

The plastics industry requires plasticizers which are non-volatile and which give plastic products showing low extraction by oil, less migration, lower embrittlement temperatures, as well as other improved properties, particularly as regards the many effects of heat and aging.

Numerous alkyl esters and diesters have been proposed and used as plasticizers for resins, especially for the vinyl polymers and copolymers.

Dioctyl sebacate is well known as a plasticizer for its low temperature performance as well as its resistance to extraction by water and soap or detergent solutions. Dioctyl phthalate is a very widely used vinyl resin plasticizer. Dibutyl sebacate and di-2-ethyl hexyladipate are both used as specialty plasticizers to give good cold temperature properties but both are quite volatile. These materials also exhibit poor oil extraction properties.

It is an object of this invention to provide a new type of alkyl esters. It is a further object of the invention to provide novel diesters having improved plasticizing characteristics especially for vinyl polymers and copolymers. Other objects will be apparent from the subsequent description.

It has now been discovered that a novel class of esters can be derived from esterification and transesterification reactions with isomeric, branched chain $C_{10}$ aliphatic diacids and especially a mixture of $C_{10}$ diacids made up from and including substantial amounts of α-ethylsuberic and α,α'-diethyladipic acid. These diacids are preferably obtained as a mixture and by a particular method as further described below. The mixture used for preparing the improved plasticizers is a mixture of isomeric aliphatic $C_{10}$ diacids and it is important and necessary that the mixture contain substantial amounts of at least one branched chain isomer.

It has recently been found that an aliphatic conjugated diolefin can be treated with finely dispersed sodium or potassium in a selected ether medium and in the presence of a relatively small amount of polycyclic aromatic hydrocarbon and/or a solid attrition agent at a temperature preferably below 0° C. to give a mixture of dimetallo derivatives of the dimerized diolefin. These dimetallo derivatives can then be carbonated at a temperature below 0° C. to give the corresponding salts of unsaturated dicarboxylic acids in high yields and selectivities.

In the case of initial reaction using sodium and butadiene, the product obtained comprises the disodium derivatives of the aliphatic isomeric octadienes. Studies of the structures of the saturated diacids arising therefrom after carbonation and hydrogenation indicate that mixtures of isomeric $C_{10}$ dicarboxylic acids are obtained. Thus, following final hydrogenation and acidification, the product mixture yields, as the major products, sebacic acid, α-ethylsuberic acid, and α,α'-diethyladipic acid.

In the preferred type of operation, the butadiene and finely dispersed sodium are reacted in an attrition apparatus such as a ball mill or pebble mill, with a selected solid attrition agent. This material is most conveniently solid sodium chloride, sodium sulfate, and the like. The disodiooctadienes formed are subsequently carbonated to the unsaturated $C_{10}$ diacids. Organic solvents are then removed and the solids are converted to an aqueous solution, which is preferably filtered prior to hydrogenation. A catalytic hydrogenation is then carried out to convert all acidic compounds to completely saturated acids.

The resulting final reaction mixture contains varying amounts of sodium salts of isomeric $C_{10}$ dicarboxylic acids of which the linear sebacic acid predominates. It also contains the valuable branched chain $C_{10}$ acids as well as small amounts of monobasic acids of varying molecular weights from $C_4$ to $C_{10}$.

The major portions of the linear isomer sebacic acid can be separated from this mixture, for instance, by saturation of the solution with sodium chloride and addition of controlled amounts of a strong acid. Benzene extraction can also be used. This produces an isomeric mixture of $C_{10}$ aliphatic dicarboxylic acids containing from 60–90% of α-ethylsuberic acid, 10–25% of α,α'-diethyladipic acid, and the remainder, 0–15%, substantially sebacic acid.

It has been found that selected esters prepared from this mixture are particularly outstanding as plasticizers. For such use, the alkyl groups of the diesters may contain 4 to 12 or more carbon atoms and, more preferably, from 4 to 8 carbon atoms, depending on the alcohol used in the esterification. However, also embodied herein are diester products of the aforedescribed mixture of diacids in which the alkyl groups may contain less than 4 carbon atoms whereby, as embodied herein, are esters such as obtained by esterification using alcohols such as methyl, ethyl, propyl, nonyl, decyl, dodecyl, and the like.

Particularly outstanding esters can be obtained by preparing diesters from butanol, and from an octyl alcohol such as n-octyl, 2-octyl(capryl), 2-ethylhexyl, and especially from "isooctyl" alcohol. The latter expression is used herein to designate a mixture of $C_8$ alcohols made from a suitable seven-carbon atom olefin mixture by the Oxo reaction, followed by hydrogenation.

The esters useful for the purpose of the present invention can be prepared by conventional esterification methods, with or without a catalyst. The preferred method of ester synthesis involves refluxing about 1 mole of the mixed isomeric diacids and about 2 to 2.5 moles of an alcohol. A diluent such as an inert solvent may be used when convenient for lowering the reflux temperature. The resulting ester is then washed in the usual manner to remove any residual acid and subjected to distillation at reduced pressure (about 1 mm.) to remove excess alcohol and moisture, if any. Alternatively, the desired ester may be made by ester interchange from the dimethyl or diethyl esters.

The results obtained from the compositions of certain diesters as embodied herein, with the vinyl resins show numerous advantages. As compared to known low temperature plasticizers, for instance, dioctyl sebacate, the oil extraction properties of esters embodied herein for plasticizer use are good as are the migration properties. In addition, the plasticizer efficiency and low temperature properties of the composition are also good. It is this combination of properties which is both surprising and outstanding.

It is entirely unexpected to find that mixed branched chain esters included in the novel class of esters embodied herein are better plasticized compositions than comparable linear products. This is particularly true for the oil extraction properties.

In the use of esters embodied herein for use as plasticizers for resin compositions, the novel diesters are usually employed, in proportions ranging from about 5 to 100 parts or preferably about 30 to 60 parts per 100 parts of resin. Polymeric materials which lend themselves to successful plasticization with plasticizing esters of the invention include the various vinyl resins such as polyvinyl chloride and mixed polymers of vinyl chloride with vinyl acetate. Such diesters show limited compatibility with polyvinyl butyral or other polyvinyl acetals. The diesters can also be used at lower levels of concentration with rubber-like polymers of diolefinic materials such as butadiene-nitrile, butadiene-styrene or polychloroprene elastomers, or isobutylene-diolefin copolymers or any other polymeric materials customarily requiring plasticization. Mixtures of these classes of materials may also be used. It should be understood that in addition to the plasticizer, the polymer compositions may also contain about 1 to 10 or 25 parts of conventional stabilizers such as basic lead carbonate, lead stearate, cadmium stearate, epoxy fatty acid compounds, or the like, as well as suitable amounts of oleic acid, auxiliary plasticizers or softeners, fillers, pigments and the like.

The following examples will serve to illustrate embodiments of the present invention, though it should be understood that the invention is not limited thereto, and that certain modifications or variations thereof are possible without departing from the spirit of the invention or from the scope of appended claims. It will be understood that all quantitative proportions referred to are expressed on a weight basis, unless expressly indicated otherwise.

EXAMPLE 1

The simple diesters of the $C_{10}$ dibasic acids were prepared and tested. The $C_{10}$ dibasic acids were obtained as mixtures by the selective dimerization of butadiene using finely dispersed sodium in the presence of an ether reaction medium and a small amount of a polycyclic aromatic hydrocarbon and/or a solid attrition agent to obtain a mixture of disodiooctadienes which is then carbonated to yield the mixture of $C_{10}$ diacids.

A typical sample of the mixed $C_{10}$ aliphatic diacids from which most of the sebacic acid has been removed shows the following properties:

| | |
|---|---|
| Boiling point at 2 mm | 185°–205° C. |
| Melting point | 50°–55° C. |
| Iodine number | less than 1. |
| Neutralization equivalent | 101–102. |

Such a sample has been analyzed to a distribution approximately as follows:

| | Percent |
|---|---|
| α-Ethylsuberic acid | 75 |
| α,α′-Diethyladipic acid | 10 |
| Sebacic acid | 12 |

In the preparation of the esters, two general procedures were followed: (1) direct esterification of acids with alcohols, with and without catalyst, while removing the water of esterification azeotropically, and (2) trans-esterification of esters of low boiling alcohols with higher boiling alcohols, using transesterification catalysts, while removing the lower boiling alcohol by rectification.

Reactants were charged to a 2-liter, three-necked flask, provided with stirring (mechanical or magnetic), openings for sampling of the reaction mixture and addition of alcohol, and a nitrogen bleed to exclude oxygen. Low boilers were taken off through a 12-bulb Snyder column (about 6 theoretical plates) which was provided with a fraction cutter or decanter (when azeotropic removal of water was desired). At completion of the reaction the crude diester product was washed or neutralized, then stripped under vacuum with steam or nitrogen. Lower boiling esters were distilled at about 1 mm. vacuum.

Details of the preparation and properties of the specific diesters prepared are shown in Table I below:

*Table I.—Ester plasticizer preparations*

| Ester No. | Alcohol reactant | Acid reactant | Method of preparation | Method of work-up | Catalyst | Sap. value, found | Sap. value, theory | Sp. gr. at 25° C. |
|---|---|---|---|---|---|---|---|---|
| 1 | 2-ethylhexanol | Mixed saturated $C_{10}$ diacids, most of sebacic acid removed. | Esterification. | Washed, stripped. | 0 | 264 | 263 | .910 |
| 2 | Iso-octanol | do | do | do | $H_2SO_4$ | 256 | 263 | .912 |
| 3 | n-Butanol | do | do | do | $H_2SO_4$ | 352 | 357 | .939 |
| 4 | Methanol | do | do | Washed, distilled. | p-Toluene sulfonic acid. | 488 | 486 | .986 |
| 5 | Ethanol | do | do | do | do | 433 | 434 | .957 |
| 6 | n-Octanol | do | do | Washed, stripped. | do | 260 | 263 | .907 |

EXAMPLE 2

For usage as plasticizers, esters as embodied herein were compared with dibutyl sebacate, dioctyl sebacate, di-2-ethylhexyl phthalate, and di-2-ethylhexyl adipate when compounded into a well-known vinyl copolymer, Vinylite VYNW, a copolymer of 95% vinyl chloride and 5% vinyl acetate.

The effectiveness and various specific properties of the defined diesters as plasticizers and in comparison with well-known diesters were determined by the following method. The liquid ester plasticizer was blended into the vinyl resin powder to give a uniform mixture. This mixture was then worked on the heated mill rolls, for a period of time until it formed a homogeneous plastic mass. The mixture was removed from the mill as a sheet and molded under suitable heat and pressure to form uniform plastic sheet stock. From these sheets, the test specimens are cut.

PROCESSING CHARACTERISTICS

The ease of processing of the ester-resin mixture is quite essential. All the aforedefined diesters were found to blend into the resins quite satisfactorily. The materials also possessed good properties of lubricity which allows easy separation of the blends from the mill rolls and mold plates.

TENSILE PROPERTIES

The tensile properties of the milled stocks were determined for each of the plasticizers. These tensile properties are tensile strength, 100% elastic modulus, and percent ultimate elongation. The test machine used is the Scott IP-4 Tensile Tester. The test specimen is annular in shape and is mounted in the test machine by placing it over two parallel, perpendicular pins or posts. These values are shown in Table II.

HARDNESS-SHORE TEST

This test is a convenient means for determining an indication of the approximate hardness of a plastic. It is based on ASTM test D-676-47T.

Sheets of the milled stock are plied up to approximately 0.25 inch. Using a Shore A2 Durometer, readings are taken immediately and again after 10 seconds. The values reported in Table II are the averages of 5 readings.

BRITTLENESS TEST

This test is intended to determine the ability of plastic materials to resist the effect of low temperature in causing them to become brittle so as to cause fracture when they are bent.

Strips of milled stock (resin and plasticizer) are immersed in the tank of the test machine which contains a cooling liquid, and are clamped at one end of the test strip. The temperature of the cooling liquid is varied in 5° C. intervals. At each temperature interval, the test specimens are subjected to a single sharp blow.

The brittle temperature is defined as the lowest temperature of non-failure of 5 consecutive test specimens under the specified test conditions. The data are shown in Table III.

FOLD ENDURANCE TEST

This is based on ASTM test D-643-43. The test involves holding a strip of plastic under definite tension and bending it repeatedly until failure occurs.

The low temperature performance of the plasticized vinyl resin stock at low temperature when subjected to a hard blow or to flexing is of primary importance. The test used to measure flexibility is carried out by folding the specimen continuously under tension at 0° C.

It has been found that the plasticizing diesters prepared as embodied herein from the mixture of $C_{10}$ diacids containing two or more of the isomeric diacids impart outstanding flex and elasticity. Particularly, these properties of the diesters are superior to those of the commonly employed dioctyl phthalate plasticizer. Table II below shows the results from the fold flex tests.

*Table II.—Comparative properties of plasticizers*

| Compound | Plasticizer conc. Percent | Plasticizer conc. P/100 | Tensile strength at 25° C., p. s. i. | 100% elastic modulus at 25° C., p. s. i. | Percent ultimate elong. at 25° C. | Shore "A" durometer hardness at 25° C. Initial | Shore "A" durometer hardness at 25° C. After 10 sec. | Fold flex, 0° C. |
|---|---|---|---|---|---|---|---|---|
| Di-2-ethylhexyl esters of mixed saturated $C_{10}$ diacids, most of sebacic acid removed. | 33.3 | 50 | 3,360±250 | 1,620±70 | 270±25 | 90 | 80 | 8,700±1,500 |
|  | 28.5 | 40 | 3,710±210 | 2,160±150 | 285±8 | 96 | 89 | 810±200 |
|  | 23.1 | 30 | 3,900±340 | 2,990±100 | 205±40 | >100 | 98 | 190±15 |
| Di-2-ethylhexyl phthalate | 33.3 | 50 | 3,180±70 | 1,740±50 | 260±10 | 85 | 75 | 500±40 |
|  | 28.5 | 40 | 3,820±210 | 2,650±250 | 230±20 | 95 | 84 | 180±30 |
|  | 23.1 | 30 | 4,500±250 | 4,050±240 | 145±10 | >100 | 97 | 100±50 |
|  |  |  | At 300% elong. |  |  |  |  |  |
| Dioctyl sebacate | 39.8 | 66 | 2,070±125 | 1,000±75 | >300 | 75 | 68 | 100,000 |
|  | 33.3 | 50 | 2,900±220 | 1,590±115 | 290±8 | 90 | 82 | 7,900±2,100 |
|  | 28.5 | 40 | 3,300±270 | 2,000±120 | 275±25 | 95 | 89 | 840±70 |
|  | 23.1 | 30 | 4,150±110 | 2,860±150 | 250±15 | >100 | 97 | 170±15 |
|  |  |  | At 300% elong. |  |  |  |  |  |
| Dibutyl esters of mixed saturated $C_{10}$ diacids, most of sebacic acid removed. | 33.3 | 50 | 2,715±105 | 1,180±45 | >300 | 77 | 69 | 17,150±13,600 |
|  | 28.5 | 40 | 3,400±130 | 1,545±100 | 283±15 | 85 | 77 | 2,175±1,250 |
|  | 23.1 | 30 | 4,375±110 | 2,755±160 | 215±10 | 98 | 89 | 230±50 |
|  |  |  | At 300% elong. |  |  |  |  |  |
| Dibutyl sebacate | 33.3 | 50 | 2,230±210 | 970±70 | >300 | 74 | 66 | >100,000 |
|  | 28.5 | 40 | 3,250±120 | 1,420±80 | 290±10 | 85 | 76 | 2,740±975 |
|  | 23.1 | 30 | 3,950±350 | 2,170±80 | 220±25 | 94 | 85 | 370±40 |
| Di-2-ethylhexyl adipate | 33.3 | 50 | 2,710±130 | 1,330±55 | 290±15 | 80 | 72 | 14,800±7,600 |
|  | 28.5 | 40 | 3,450±140 | 1,900±65 | 255±30 | 90 | 80 | 3,010±1,840 |
|  | 23.1 | 30 | 4,030±190 | 2,600±125 | 230±20 | 98 | 93 | 325±40 |
| Dicapryl esters of mixed saturated $C_{10}$ diacids, most of sebacic acid removed. | 33.3 | 50 | 2,890±295 | 1,640±150 | 280±25 | 85 | 75 | 4,000±2,600 |
|  | 28.5 | 40 | 3,390±140 | 2,060±100 | 260±40 | 93 | 85 | 1,040±160 |
|  | 20.0 | 25 | 4,110±290 | 3,310±140 | 250±25 | >100 | 99 | 120±30 |

PERMANENCE

It is also a requirement that an article of manufacture should possess its original properties throughout its entire period of use. The plasticizer should not volatilize, it should not be readily extracted by water or soap and detergent solutions, or oils or gasolines and the like, and it should not migrate into adjacent finishes and coatings to soften or mar them. The diester plasticizers show outstanding resistance to migration when incorporated into vinyl compositions when compared with known low-temperature type ester plasticizers. It is a great advantage in that vinyl compositions plasticized with these compounds will not adhere or stick to lacquer, varnish and paint surfaces.

RESISTANCE TO EXTRACTION BY WATER, SOAP AND DETERGENT SOLUTIONS

This test is a compromise of the methods used elsewhere.

Duplicate samples, 1.0 x 3.0 x 0.065 inches, are weighed analytically and immersed in the water, soap and detergent solutions.

The water is changed every working day and kept at 25° C. After a week the samples are held for one hour at 80° C., cooled in a desiccator and weighed. The loss is then calculated.

The soap solution is 1% Ivory Flakes while the detergent solution is 1% Rinso. The samples are put into the solutions at 80° C. and this temperature is maintained for 48 hours. The samples are rinsed and then dried at 80° C. for one hour. After cooling in a desiccator, the samples are weighed and the calculations made.

RESISTANCE TO OIL EXTRACTION

This test is a modified procedure of ASTM D-543-43 and is intended for use in determining the resistance of a plastic to a light mineral oil. Test specimens are cut from milled stock and immersed in a clear white mineral oil for 7 days at 25° C. Changes in weight and appearance of the test specimens are observed and reported. The accompanying figure shows a graph in which the comparative results of the tests obtained with dioctyl sebacate, dioctyl esters of the mixed acids, dibutyl sebacate, and dibutyl esters of the mixed acids. Both the dioctyl and dibutyl esters of the mixed saturated $C_{10}$ diacids show superior resistance to oil extraction as compared with other well-known low temperature plasticizers. The dibutyl ester is especially outstanding.

MIGRATION

This test is a procedure for evaluating the resistance of various surface finishes to plasticized vinyl stocks.

Four test finishes (white enamel, varnish, metal lacquer, and furniture lacquer) are applied to tin panels and allowed to dry for at least one week. Strips of the milled stock are placed in intimate contact with the finishes and stored at 25° C. under 0.25 pounds per square inch pressure. At intervals, the specimens and finishes are examined.

The known sebacate plasticizers have the disadvantage of showing marked migration, while the plasticizers from the mixed saturated $C_{10}$ diacids limit migration.

Migration can also be measured quantitatively using silicic acid as an absorbent. The test employed was a modification of the method of Grafton and Greenly.

Duplicate specimens, 2.69 inches in diameter and .065 inches thick, are weighed analytically. 25 cc. of silicic acid, AR-100 mesh, are placed in a half-pint paint can (slightly larger in diameter than the specimens). A sample is placed on the acid and covered with 25 cc. of acid. The second sample is introduced and covered with 25 cc. of acid. An aluminum foil barrier is inserted and the arrangement repeated until the can is full. Hardwood filler blocks (same diameter as samples) are inserted and a 20-pound weight placed on top. The arrangement is left for four days when the samples are removed, brushed clean and weighed. The percent plasticizer loss is reported as is the original concentration of plasticizer. The migration test results are shown in Table III.

The comparisons of the well-known and most commonly used vinyl resin plasticizers with novel diesters from the mixed isomeric $C_{10}$ diacid, as shown in Table III, indicate that the new plasticizers are in every instance essentially equivalent to the known materials. In some instances, such as in migration, and plasticizer efficiency, these new plasticizers show improved behavior in these tests over the commonly used materials.

EFFICIENCY

Using the Scott Tensile Tester, Model IP-4, the 100% elastic modulus are obtained from the stock containing various amounts of the plasticizer per 100 parts of the resin by weight.

A graph can then be made by plotting weight of plasticizer vs. the pound per square inch for 100% elongation. From this graph there is selected the weight of plasticizer which corresponds to 3600 p. s. i.

The efficiency equals the weight of plasticizer per 100 grams of resin to give 100% elongation under a selected degree of loading. The data shown were based upon 3600 pounds per square inch loading.

*Table III.—Comparative properties of plasticizers*

| Compound | Plasticizer conc. | | Brittle point, °C. | Oil resistance, Percent | Percent weight incr. | Percent sol. matter lost | Percent water absorbed | Percent efficiency, 3,600 p.s.i. |
|---|---|---|---|---|---|---|---|---|
| | Percent | P/100 | | | | | | |
| Di-2-ethylhexyl esters of mixed saturated $C_{10}$ di-acids, most of sebacic acid removed. | 33.3 | 50 | <−61 | −11.0 | .12 | .00 | .12 | 19.0 |
| | 28.5 | 40 | −50 | −7.4 | .11 | .00 | .11 | |
| | 23.1 | 30 | −40 | −1.6 | .10 | .00 | .10 | |
| Di-2-ethylhexyl phthalate | 33.3 | 50 | −30 | −.58 | .09 | .00 | .09 | 23.3 |
| | 28.5 | 40 | −20 | −.29 | .07 | .00 | .07 | |
| | 23.1 | 30 | −10 | −.07 | .07 | .00 | .07 | |
| Dioctyl sebacate | 39.8 | 66 | <−61 | −16.8 | .14 | .00 | .14 | 20.4 |
| | 33.3 | 50 | <−61 | −14.3 | .11 | .00 | .11 | |
| | 28.5 | 40 | −55 | −7.8 | .11 | .00 | .11 | |
| | 23.1 | 30 | −45 | −2.2 | .12 | .00 | .12 | |
| Dibutyl esters of mixed saturated $C_{10}$ diacids, most of sebacic acid removed. | 33.3 | 50 | <−60 | −5.7 | .13 | .28 | .41 | 21.8 |
| | 28.5 | 40 | −40 | −3.0 | .14 | .11 | .25 | |
| | 23.1 | 30 | −30 | −1.0 | .12 | .13 | .25 | |
| Dibutyl sebacate | 33.3 | 50 | <−60 | −11.1 | .16 | .01 | .17 | 16.8 |
| | 28.5 | 40 | −55 | −6.7 | .19 | .03 | .22 | |
| | 23.1 | 30 | −45 | −3.0 | .14 | .07 | .21 | |
| Di-2-ethylhexyl adipate | 33.3 | 50 | −55 | −5.5 | .11 | .04 | .15 | 22.2 |
| | 28.5 | 40 | −45 | −2.9 | .11 | .04 | .15 | |
| | 23.1 | 30 | −35 | −1.2 | .09 | .03 | .12 | |
| Dicapryl esters of mixed saturated $C_{10}$ diacids, most of sebacic acid removed. | 33.3 | 50 | −55 | −13.3 | .15 | .01 | .15 | 18.6 |
| | 28.5 | 40 | −45 | −6.4 | .10 | .02 | .12 | |
| | 20.0 | 25 | −30 | −.66 | .10 | .00 | .10 | |

VOLATILITY

The method used to measure the volatility of the plasticizers from the stock was a severe exposure of the stocks in a circulating air oven at 100° C.

The results of tests on a copolymer of 95% vinyl chloride and 5% vinyl acetate with 33.3% plasticizer are shown in Table IV. Table IV shows the effects of exposure for 7 days at 100° C. in a circulating air oven.

The novel esters were, in every case, equivalent to the diesters in use, and in some cases, the new compounds exhibited somewhat better volatility characteristics.

Table IV.—Volatility and stability tests

| Compound | Tensile strength (p. s. i.) Before | After | 100% modulus (p. s. i.) Before | After | Ultimate elongation (percent) Before | After | Weight loss (percent) Of total | As plasticizer |
|---|---|---|---|---|---|---|---|---|
| Di-2-ethylhexyl ester of mixed saturated $C_{10}$ diacids, most of sebacic acid removed | 3,360 | 3,350 | 1,620 | 2,300 | 270 | 275 | 10.7 | 32.1 |
| Dioctyl sebacate (DOS) | 2,900 | 2,800 | 1,590 | 1,800 | 290 | 255 | 2.4 | 7.2 |
| Di-2-ethylhexyl phthalate (DOP) | 3,320 | 3,250 | 1,870 | 2,260 | 260 | 200 | 5.9 | 17.7 |
| Dibutyl sebacate (DBS) | (¹) | (¹) | (¹) | (¹) | (¹) | (¹) | 28.9 | 86.7 |
| Dibutyl ester of mixed saturated $C_{10}$ diacids, most of sebacic acid removed | ² 2,715 | 4,150 | 1,180 | 3,500 | <300 | 100 | 21.8 | 65.5 |
| Di-2-ethylhexyl adipate (DOA) | 2,710 | 3,200 | 1,330 | 2,200 | 290 | 210 | 11.3 | 33.7 |

¹ Too brittle to test.
² At 300% elongation.

This application is a continuation-in-part of Serial No. 436,962, filed June 15, 1954, and entitled "Novel Ester Plasticizers."

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. An alkyl ester of a mixture of $C_{10}$ isomeric aliphatic diacids consisting essentially of about 60–88% α-ethylsuberic acid, and the remainder of the diacids consisting of a mixture of α,α'-diethyladipic acid and sebacic acid.

2. An alkyl ester of a mixture of $C_{10}$ isomeric aliphatic diacids consisting essentially of about 60–88% α-ethylsuberic acid, about 10–25% of α,α'-diethyladipic acid, and the remainder, sebacic acid.

3. A $C_4$–$C_8$ alkyl ester of a mixture of $C_{10}$ isomeric aliphatic diacids consisting essentially of about 60–88% α-ethylsuberic acid, and the remainder of the diacids consisting of a mixture of α,α'-diethyladipic acid and sebacic acid.

4. A $C_4$–$C_8$ alkyl ester of a mixture of $C_{10}$ isomeric aliphatic diacids consisting essentially of about 60–88% α-ethylsuberic acid, about 10–25% of α,α'-diethyladipic acid, and the remainder, sebacic acid.

References Cited in the file of this patent

UNITED STATES PATENTS

| | | |
|---|---|---|
| 2,227,154 | Russel | Dec. 31, 1940 |
| 2,403,804 | Kesslin et al. | July 9, 1946 |
| 2,539,503 | Zisman et al. | Jan. 30, 1951 |
| 2,548,493 | Robey | Apr. 10, 1951 |
| 2,548,494 | Smith | Apr. 10, 1951 |
| 2,585,409 | Robinson et al. | Feb. 12, 1952 |
| 2,680,713 | Lindsey et al. | June 8, 1954 |
| 2,773,092 | Carley et al. | Dec. 4, 1956 |

OTHER REFERENCES

Bruner, Ind. Eng. Chem. 41 (1949) pages 2860–4.